Feb. 9, 1954 B. W. KEESE 2,668,601
LUBRICATING MEANS FOR DIFFERENTIAL MECHANISMS
Filed Jan. 4, 1951
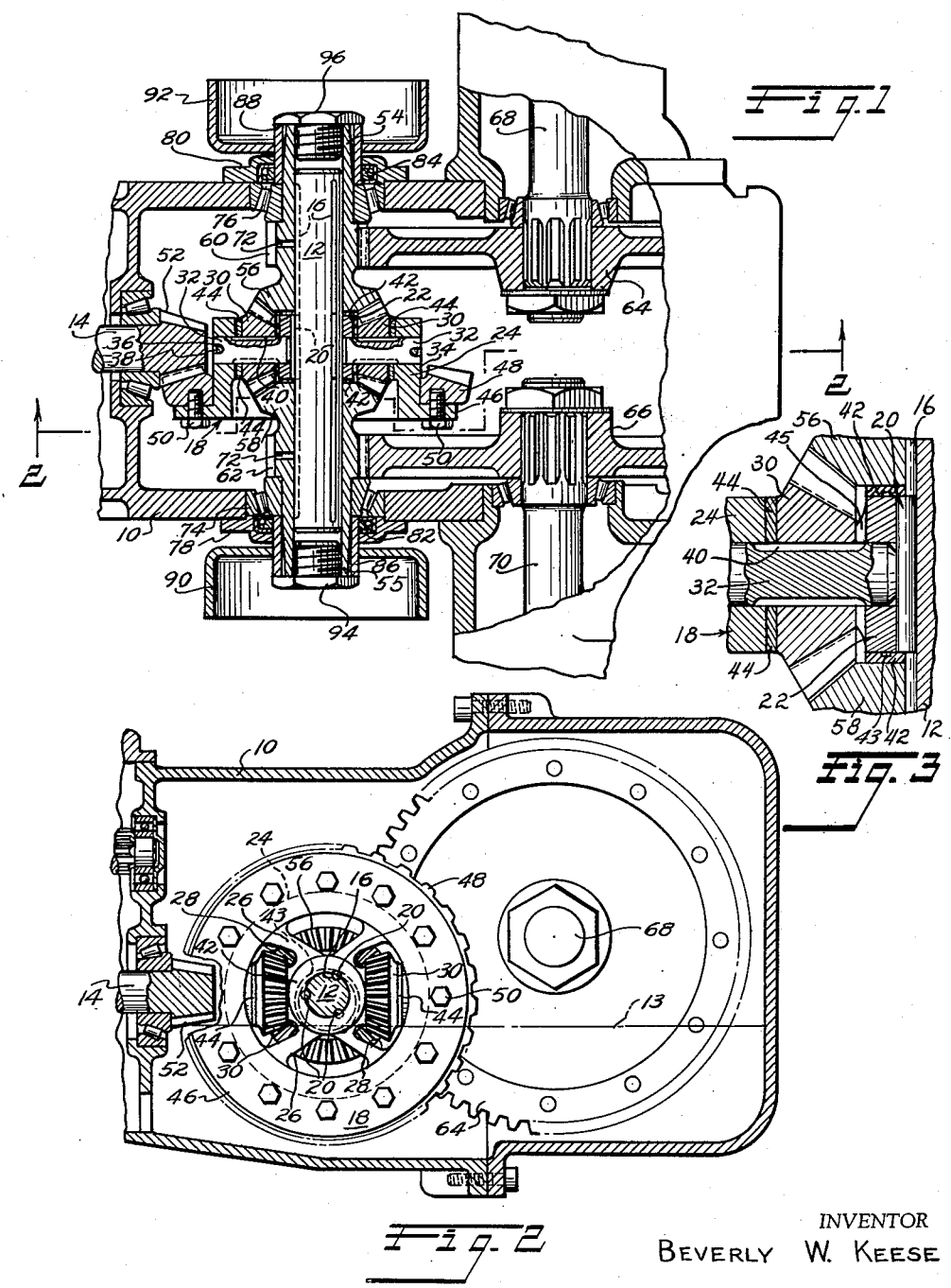
INVENTOR
BEVERLY W. KEESE
BY Strauch, Nolan + Diggins
ATTORNEYS Patented Feb. 9, 1954

2,668,601

UNITED STATES PATENT OFFICE 2,668,601

LUBRICATING MEANS FOR DIFFERENTIAL MECHANISMS

Beverly W. Keese, Oshkosh, Wis., assignor, by mesne assignments, to Rockwell Spring and Axle Company, Coraopolis, Pa., a corporation of Pennsylvania Application January 4, 1951, Serial No. 204,436

11 Claims. (Cl. 184—11)

This invention relates to differential gearing mechanisms for motor vehicles and the like and more particularly to lubricating means for such mechanisms. This application is a continuation-in-part of application Serial No. 767,230, filed August 7, 1947, for Power Take-off Mechanism, of B. W. Keese et al., and of my copending application Serial No. 524,600, filed March 1, 1944, for Motor Vehicle Driving Mechanism, now United States Letters Patent No. 2,537,060 issued January 9, 1951.

Certain of the bearing surfaces of differential gear mechanisms which are located inaccessibly within the rotating assembly are extremely difficult to lubricate satisfactorily. Examples of such inaccessible bearing surfaces are: those between the differential side gears and the shaft upon which they are journalled, those between the ends of the differential side gears and the hub of the spider member, and those between the differential pinions and the radially extending pins upon which they are journalled.

It is customary in certain vehicles to mount a differential mechanism within a housing upon a transversely extending main shaft which is journalled for rotation above an oil bath in the bottom of the housing. The level of oil is maintained at a level such that the lower portion of the differential gear mechanism will pass through the oil bath as it rotates.

It is accordingly the primary object of this invention to provide a novel means for transmitting oil from such an oil bath to the inaccessible bearing surfaces within the differential mechanism.

More specifically, it is an object of this invention to provide in a differential mechanism a novel means of lubricating the bearing surfaces between a shaft and a body mounted for rotation thereon in which lubricant distributing grooves are formed in the bearing surfaces of one of these members and oil feeding channels are formed through the body to transmit oil from an oil bath to the oil distributing grooves.

A further object of this invention is to provide a novel means for lubricating the bearing surfaces of the side gears of a differential mechanism which are journalled on a main shaft and for fixing the spider member of such a differential mechanism for rotation with the main shaft.

A more specific object of this invention is to provide a differential assembly comprising a main shaft member having a plurality of longitudinally extending peripheral lubricant receiving grooves, a pair of differential side gears journalled on the main shaft member and receiving lubricant through the grooves, a differential spider member carrying a plurality of differential pinions meshed with the side gears, and key members engaged in the lubricant receiving grooves and connecting said spider member with the main shaft for rotation therewith.

These and other objects of this invention will become apparent as the detailed description proceeds in connection with the accompanying drawings wherein:

Figure 1 is a sectional plan view of a differential mechanism of a vehicle drive train taken through the axis of the main shaft of the differential mechanism.

Figure 2 is a vertical sectional view taken along the line 2—2 of Figure 1.

Figure 3 is an enlarged view of the differential pinion mounting within the spider assembly.

Referring to the drawings wherein an exemplary embodiment of this invention is shown and more particularly to Figure 1 thereof, the differential drive mechanism for the vehicle wheels is contained in a housing compartment 10 and includes a transversely positioned main shaft 12, preferably located with its axis disposed in a common horizontal plane with the axis of the longitudinally extending transmission power output shaft 14 above an oil bath the level of which is indicated by line 13 in Figure 2. The shaft 12 has a plurality of longitudinally extending oil distributing grooves 16 formed along its periphery.

A spider 18 is pressed upon the central portion of said shaft 12 and connected thereto for rotation therewith by a plurality of cylindrical key members 20 interlocking in said grooves 16 and in mating grooves within the bore of said spider. Key members 20 are preferably short, being only as long as the hub 22 of the spider so that the rest of grooves 16 may serve as oil distributing channels. The spider 18, as is more clearly shown in Figure 2, has a hub portion 22, a rim portion 24 and a connecting web portion 26. The web portion 26 at diametrically opposite sides of the shaft 12 is provided with openings 28 therein to accommodate the bevel pinions 30 rotatably mounted upon radially disposed pins 32, the ends of which are fixed in aligned openings in the hub 22 and rim 24 of the spider 18. The peripheral face 34 of the spider rim 24 is provided with an annular groove and each of the pins 32 with a registering groove 36 in its outer end face to receive a locking ring 38, whereby said pins 32 are held against both rotative and longitudinal movement relative to the spider 18.

As is shown in Figure 3, the unloaded portion of each pin 32, at diametrically opposite portions, has longitudinally flattened surfaces 40 spaced from pinions 30 to provide oil circulating passages. Washers 42, which surround shaft 12 adjacent each face of the hub 22, are formed with eccentric circular surface grooves 43 for a similar purpose. Washers 44 surround pins 32 intermediate pinions 30 and rim 24. The hub 22 of spider 18 is formed with diametrically aligned bosses surrounding pins 32 and in contact with the adjacent faces of pinions 30. Oil feeding passages 45 which are surface grooves formed on the face of these bosses connect with the channels formed by the flattened surfaces 40 to feed oil to lubricate the pinion bearing surfaces when immersed in the oil bath.

Referring again to Figures 1 and 2, the spider rim 24, at one side thereof, has an integrally formed annular flange 46 to which the ring gear 48 is secured by bolts 50. The teeth of this ring gear 48 are in meshing engagement with the teeth of the bevel gear 52 on the power output shaft 14 so that unitary rotation of the spider 18 and pinions 30 thereon in a vertical plane about the axis of the transverse shaft 12 is produced.

At each side of the spider 18 a pair of sleeves 54 and 55 having a pair of side gears 56 and 58 formed integral therewith, are mounted for rotation upon the shaft 12 adjacent spider 18, side gears 56 and 58 being in meshing engagement with pinions 30. Adjacent side gears 56 and 58 and also formed integrally with sleeves 54 and 55 respectively are a pair of spur pinions 60 and 62. Pinions 60 and 62 mesh respectively with final drive gears 64 and 66 which are splined respectively to vehicle wheel axles 68 and 70. As the sleeves 54 and 55 rotate, oil from the oil bath passes along one or more oil passages 72 through the sleeves into the longitudinal oil distributing grooves 16 on shaft 12 for lubricating the sleeve and side gear bearings.

Shaft 12 and sleeves 55 and 54 are rotatably supported on the opposite side walls of housing compartment 10 by the tapered roller bearings 74 and 76 respectively. The inner race rings of these bearings have a driving fit on the respective sleeves and are engaged by the outer sides of the spur gears 62 and 60 thereon. At the outer side of bearings 74 and 76, ring members 78 and 80 are engaged with the outer bearing races and secured to the housing wall by any suitable means. Between these members and the outer face of said wall or between the outer bearing races and these members, bearing adjusting shims may be interposed if necessary.

Members 78 and 80 are each internally formed to receive annular oil seals 82 and 84 of conventional type, which surround the inner end portions of the hubs 86 and 88 of brake drums 90 and 92 which are fixed upon the outer ends of the respective sleeves 54 and 55. Each of said sleeves 55 and 54 extends beyond the corresponding end of shaft 12 and is externally longitudinally splined to engage the internally tapered splined hubs 86 and 88. The projecting ends of sleeves 55 and 54 are interiorly threaded to receive machine screws 94 and 96 to tightly seal the ends of the sleeve walls to prevent the leakage of oil.

In operation, portions of the spider 18, the gear 48, the pinions 30, the side gears 56 and 58, and the spur pinions 60 and 62 are immersed in the oil during the rotation of the differential gear assembly. Oil will pass through passages 45 and channels 49 to lubricate the bearing surface between pinions 30 and pins 32, through passages 72 and channels 16 to lubricate the bearing surfaces between sleeves 54 and 55 and shaft 12, and through channels 43 to lubricate the bearing surfaces between the end of hub 22 and washers 42. Thus a very simple but effective means has been developed for lubricating the inaccessible bearing surfaces of a differential gear mechanism.

This invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a differential gear mechanism, housing structure, a shaft journalled for rotation within said housing structure about an axis above the surface of an oil bath therein, a spider non-rotatably mounted on said shaft, radially extending pins fixed within said spider, a plurality of differential pinions journalled thereon by cooperating contacting bearing surface pairs, differential side gears journalled on said shaft adjacent said spider by further cooperating contacting bearing surface pairs and meshing with said pinions, and lubricating means for said mechanism comprising oil distributing channels formed on one of each of said pairs of contacting bearing surfaces of the differential gear mechanism and means for feeding oil to said oil distributing channels from the oil bath.

2. The combination defined in claim 1 wherein said last named means are a plurality of oil feeding passages so formed through certain members of said differential gear mechanism that one end thereof will be immersed in the oil bath during rotation of said members for the reception of oil, the other end thereof being in communication with said oil distributing channels.

3. In a differential gear mechanism, housing structure, a shaft journalled for rotation in a horizontal plane within said housing structure above the surface of an oil bath therein, a spider non-rotatably mounted on said shaft, a plurality of radially extending pins fixed within said spider, differential pinions journalled on said pins, differential side gears journalled on said main shaft adjacent said spider and meshing with said pinions, elongated sleeves fixed to the side gears and surrounding said shaft, and lubricating means for said mechanism comprising oil distributing channels formed on the surface of said main shaft and extending longitudinally thereof and oil feeding passages extending radially through said elongated sleeves to interconnect at one end with said oil distributing channels and to be immersed in the oil bath during the rotation of said sleeves.

4. In a differential gear mechanism, a rotatable shaft, a spider non-rotatably mounted on said shaft and having a portion adapted to be submerged in an oil bath in operation, radially extending pins fixed within said spider, a plurality of differential pinions journalled on said pins, differential side gears journalled on said main shaft and meshed with said pinions, said side gears being fixed to elongated sleeves surrounding said shaft, lubricating means comprising oil distributing channels formed on the surface of said shaft and extending longitudinally thereof, and oil feeding passages extending from the exterior to the interior of said elongated sleeves and adapted during rotation of said mechanism to supply oil to said channels.

5. The combination defined in claim 4 wherein said spider has a short internally longitudinally grooved hub surrounding said shaft and a plurality of short keys are mounted in said longitudinally extending oil distributing channels and the mating longitudinal grooves within the hub of said spider.

6. In a differential gear mechanism, housing structure, a shaft journalled for rotation in a horizontal plane within said housing structure above the surface of an oil bath therein, a spider non-rotatably mounted on said shaft, a plurality of radially extending pins fixed within said spider, differential pinions journalled on said pins, differential side gears journalled on said main shaft, adjacent each side of said spider meshing with said pinions, and lubricating means for said differential pinions comprising longitudinally extending oil distributing channels formed on the surface of said pins and oil feeding passages through said spider interconnecting at one end with said oil distributing channels and positioned for immersion in the oil bath during the rotation of said spider to feed lubricant to the bearing surfaces between said pins and said differential pinions.

7. In a differential gear mechanism, a housing, a shaft journalled for rotation in a horizontal plane within said housing above the surface of an oil bath therein, a spider fixed to said shaft, a plurality of radially extending pins fixed within said spider, a differential pinion journalled on each of said pins, a differential side gear journalled on said shaft adjacent each side of spider in constant mesh wth said pinions, said spider having a hub, a spacer interposed between each of said side gears and the adjacent faces of said hub in surface contact with the opposite faces of said hub, and lubricating means therefor comprising an oil distributing channel formed in the surface of each of said spacers contacted by said hub and adapted to be immersed in said oil bath during the rotation of said spider to lubricate the bearing surfaces between said hub and each of said spacers.

8. Differential drive mechanism for motor vehicles comprising a main shaft having a plurality of longitudinal oil distributing grooves on its periphery, a pair of differential side gears rotatably mounted on said shaft over said grooves, a spider having a hub portion disposed on said shaft between said side gears, means interlocked in said grooves to connect said spider and shaft for unitary rotation, a plurality of power transmitting gears rotatably mounted on said spider in constant mesh with said side gears, and means rotatable with said side gears for feeding oil to said grooves.

9. A differential vehicle drive assembly comprising a main shaft having a plurality of axially extending lubricant distributing grooves, a pair of differential side gears, coacting bearing surfaces on said shaft and said side gears journalling said side gears on said shaft and adapted to receive lubricant through said grooves, a differential spider disposed on said shaft intermediate said side gears, a plurality of differential pinions rotatably mounted in said spider in constant mesh with said side gears, keys engaged within said lubricant receiving grooves for non-rotatably securing said spider to said shaft, and means rotatable with said side gears for feeding lubricant to said lubricant distributing grooves.

10. In a differential drive mechanism, a shaft, a differential spider having a hub surrounding an intermediate portion of said shaft, a plurality of differential pinions rotatably mounted on said spider, oil conducting channels on the surface of said shaft extending substantially the length of said shaft, internal grooves formed in said hub in alignment with said shaft channels, keys disposed in said aligned channels and grooves for non-rotatably connecting the shaft and spider, differential side gears journalled on said shaft in constant mesh with said pinions and having elongated hubs extending over said channels, and means rotatable with said side gears for feeding oil to said oil conducting channels.

11. In the differential drive mechanism defined in claim 10, a power output gear on each said elongated side gear hub remote from the side gear, and said last named means comprising a generally radial oil passage through each said output gear and hub.

BEVERLY W. KEESE.

References Cited in the file of this patent

UNITED STATES PATENTS

| Number | Name | Date |
|---|---|---|
| 1,480,642 | Theoret | Jan. 15, 1924 |
| 1,966,434 | Barker | July 17, 1934 |
| 2,121,214 | Vandervoort | June 21, 1938 |
| 2,242,605 | Casner | May 20, 1941 |